United States Patent

[11] 3,576,996

| [72] | Inventor | Donald W. Stevens<br>West Concord, Mass. |
|------|----------|------------------------------------------|
| [21] | Appl. No. | 815,761 |
| [22] | Filed | Apr. 14, 1969 |
| [45] | Patented | May 4, 1971 |
| [73] | Assignee | The United States of America as represented by the Secretary of the Air Force |

[54] INSTRUMENT FOR MEASURING THE NET FLUX OF RADIANT ENERGY THROUGH A PLANE
1 Claim, 4 Drawing Figs.

| [52] | U.S. Cl. | 250/83.3, 73/355 |
|------|----------|------------------|
| [51] | Int. Cl. | G01t 1/16 |
| [50] | Field of Search | 250/83.3, 83.3 (IR); 73/355 |

[56] References Cited
UNITED STATES PATENTS
3,379,883  4/1968  Ward et al. ............ 250/83.3

Primary Examiner—James W. Lawrence
Assistant Examiner—Davis L. Willis
Attorneys—Harry A. Herbert, Jr. and Henry S. Miller, Jr.

ABSTRACT: A pair of solar radiation-absorbing surfaces mounted on opposite sides of a probe utilize the Seebeck and Peltier effects to maintain equal surface temperatures thereby avoiding errors due to wind. The current produced by the effects is a measure of the net radiation.

PATENTED MAY 4 1971

INVENTOR.
DONALD W. STEVENS
BY Harry A. Herbert Jr
ATTORNEY
Henry S. Miller Jr
AGENT

INVENTOR.
DONALD W. STEVENS

INSTRUMENT FOR MEASURING THE NET FLUX OF RADIANT ENERGY THROUGH A PLANE

BACKGROUND OF THE INVENTION

This invention relates generally to thermal radiation measurements, and more particularly to an instrument for measuring the net flux of solar radiation energy through a plane.

In the past, in order for meteorologists and weather forecasters to measure net radiant energy, devices had to be used which were sensitive to the wind and, as a result, were inaccurate on windy days. Net radiant energy is the difference between direct solar radiation and reradiated or ground radiation, and gives an indication of the radiation available to evaporate moisture in the air and to heat the air during the hours of darkness, for example. Conventional net radiometers produce an output proportional to the temperature difference between the absorbing surfaces. If has been found that wind blowing across these surfaces produces markedly different results, depending on how each surface is oriented to the wind. Prior art devices must incorporate shields or other means of minimizing wind effect. One prior art device utilizes plastic hemispheres surrounding the surfaces which must be filled with dry air. These devices have been shown to be sensitive to the wind and, in addition, they provide numerous problems by the attenuation of the radiation caused by the plastic as well as the inconvenience of providing a constant source of dry air.

This invention has application in industrial manufacturing processes as well as in the field of meteorology in that it provides a broad band radiation detector and as such could be utilized in assembly line quality control procedures.

SUMMARY OF THE INVENTION

This invention avoids the difficulties of the prior art by keeping the radiation-absorbing surfaces at the same temperature thereby eliminating the necessity for shields or artificial ventilation and thus reducing the sensor complexity and insuring greater reliability and dependability. The net radiometer incorporates a thermal balance created by the utilization of the Seebeck and Peltier effects between a pair of thermopiles which are arranged so that all of the thermal junctions of one type lie in a plane and all of the thermal junctions of the opposite type lie in another oppositely directed plane. These two planar surfaces are treated to obtain uniform absorptivity over the appropriate range of radiation wave lengths. Under exposure to a net radiative flux the two absorbing surfaces tend to attain different temperatures, and through the Seebeck effect the thermopile produces an electrical voltage proportional to the temperature difference. This voltage is applied to an electronic control circuit. The control circuit generates a current which is applied to the thermopile in such a way that, through the Peltier effect, thermal energy is transferred between the exposed surfaces to drive them to the same temperature. The direction and magnitude of this current is then proportional to the direction and magnitude of the net radiative flux and measurable with a calibrated current measuring device.

The instrument may be made wavelength selective by incorporating appropriate filters over the sensing surfaces. Also, it may be converted to a total hemispherical radiometer by covering one of the surfaces of a highly reflective coating.

It is therefore an object of this invention to provide a new and improved thermal balance radiometer.

It is another object of this invention to provide a new and improved means for measuring net radiation.

It is a further object of this invention to provide a net radiation measuring instrument that is insensitive to wind.

It is still another object of this invention to provide a net radiation measuring instrument that has faster response than any hitherto known.

It is still a further object of this invention to provide a radiometer which is more accurate than any prior art similar device.

It is another object of the invention to provide a radiometer which is economical to produce and utilizes conventional, currently available components that lend themselves to standard mass production manufacturing techniques.

These and other advantages, features and objects of the invention will become more apparent from the following description.

DESCRIPTION OF THE PREFERRED EMBODIMENT

Figure 1:
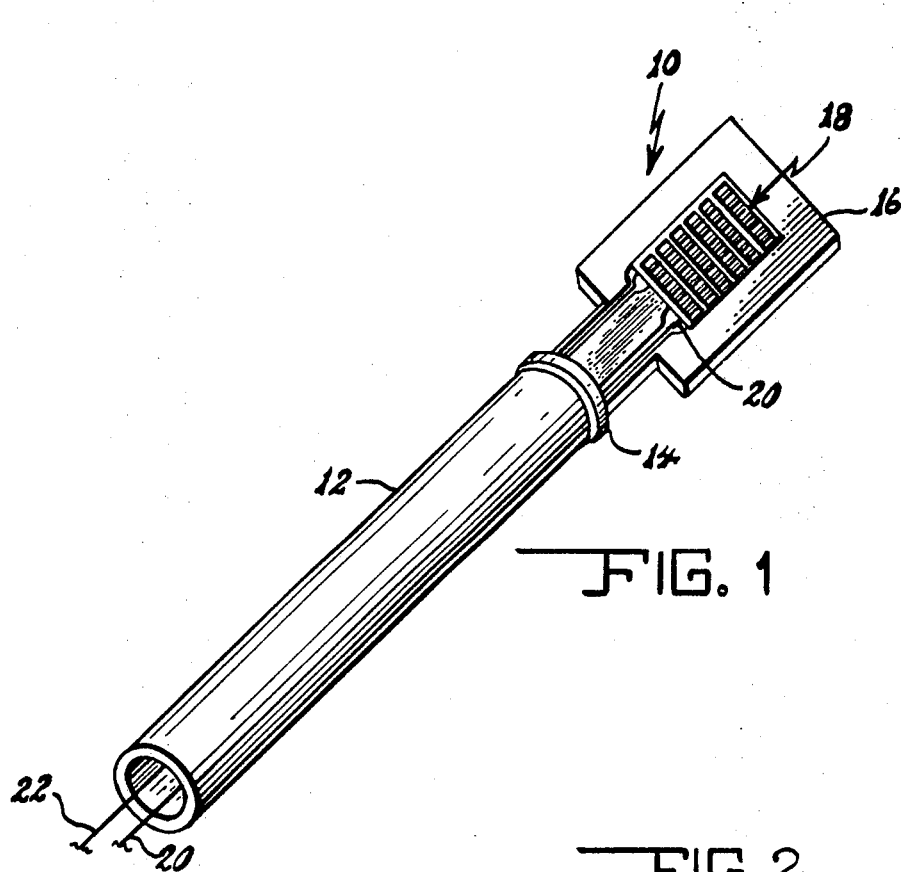
FIG. 1 is a plane view of the invention.

Referring now to FIG. 1, there is shown generally the sensing head 10. Attached to the head is an elongated support handle 12. The head 10 is securely mounted to the handled by an appropriate cement or other means at 14. The sensing unit consists of a solid state thermopile 18 mounted in a dielectric frame 16. This thermopile is comprised of a plurality of thermocouples connected in an electrical series. One half of these thermocouples makes up one of the active faces of the sensor, and the remaining half makes up the other active face. Leads 20 and 22 pass through the handle and out to the support means (not shown).

Figure 2:
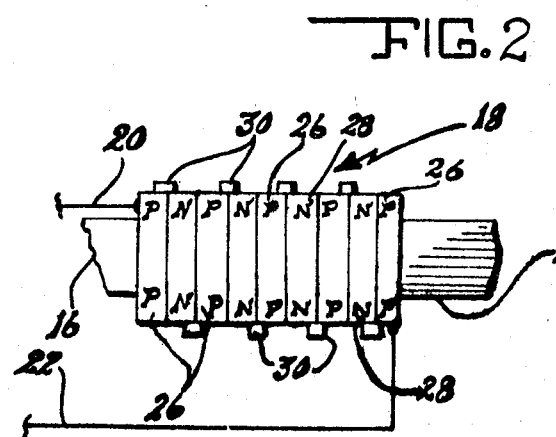
FIG. 2 is a side elevational view of the sensing portion of the invention.

FIG. 2 shows a cross-sectional view of the frame 16 and the thermopile 18. The thermopile is made up of alternately spaced blocks of P- and N-type materials 26 and 28 respectively, cemented together in a matrix and supported by frame 16. The blocks of P- and N-type material are connected by metal straps 30 to form the individual thermocouples of the thermopile. The exposed surfaces of these straps are treated to provide uniform absorptivity over the desired range of radiation wavelengths.

Figure 3:
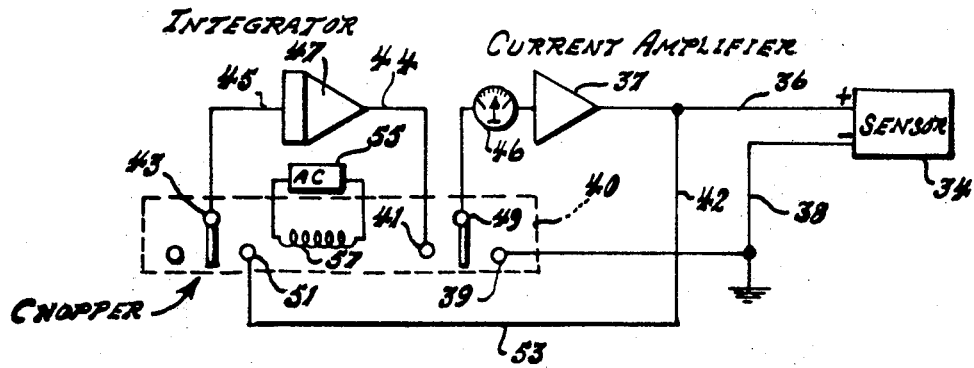
FIG. 3 is a block circuit diagram of the invention.

In FIG. 3 is shown a block diagram of the electrical circuit of the invention. The sensor is shown at 34 having leads 36 directed to a current amplifier 37. Lead 38 goes to ground and one terminal of the chopper 40. Line 42 is taken from line 36 and goes to terminal 39 of chopper 40. The remaining two terminals 41 and 43 in the chopper are connected to lines 44 and 45 and have an integrator 47 connected therebetween. A milliameter 46 is connected between terminal 49 on the chopper and the current amplifier 37 and provides an output for the radiation center. Terminal 51 is connected to line 53 and bypasses the current amplifier 37. A source of alternating current is provided at 55 to operate the coil 57 of the chopper 40.

Figure 4:
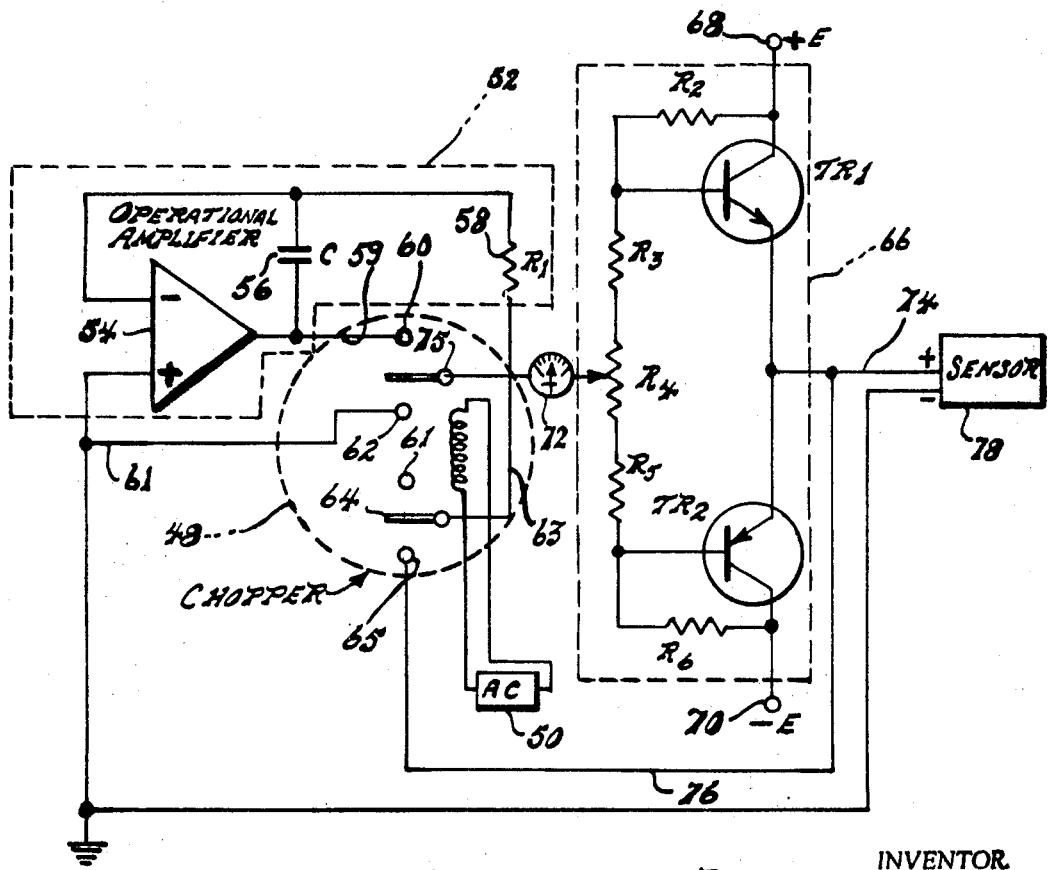
FIG. 4 is a complete circuit diagram.

In FIG. 4 the chopper 48 is driven by an AC signal generator 50 at a fixed rate. An integrator 52 comprises an operational amplifier 54, capacitor 56 and resistor 58, and is connected via line 59 to the terminal 60 of the chopper 48. Line 61 connects the integrator to terminal 62 of the chopper. Line 63 connects the integrator to terminal 64 of the chopper. The current amplifier 66 consists of transistors TR1 and TR2 having biasing resistors $R_2$, $R_3$, $R_4$, $R_5$ and $R_6$. A positive DC voltage enters the circuit at point 68 and a negative DC voltage at point 70. Resistor $R_4$ is a variable resistor to provide calibration for the milliameter 72 located between the current amplifier and terminal 75 of the chopper. When the chopper contacts are in contact with terminals 62 and 65 the input to the current amplifier is grounded and no current is applied to the sensor. At the same time the positive sensor lead 74 is connected to the integrator input by line 76. If the sensor surfaces are not at the same temperature, the sensor output voltage (Seeback effect) is integrated by the integrator 52, and the integrator output begins changing. There is a built-in polarity reversal in the integrator, so that a positive input produces a negative going output, and vice versa. When the chopper contacts switch to contacts 60 and 61 the integrator input is opened, and its output "holds" at the value it had attained when the contact at contacts 60 and 65 was broken. The output from the integrator 52 now is applied to the current amplifier 66 and a current flows through the sensor 78. The magnitude of this current is proportional to the time-integrated value of the sensor output voltage during the previous chopper position. The direction of this current is such that the Peltier effect in the sensor reduces the temperature difference between the sensing surfaces. The current is cut off when the chopper makes contact again with contacts 62 and 65; however, if the thermal time constant of the sensor is long compared with the chopper dwell time, the sensor output voltage will reflect the reduction in temperature difference. As a result, on each successive sample of the sensor output the integrator output will change by a smaller amount. After a few cycles, the integrator output voltage and thus the average current to the sensor will reach the steady values required to keep the sensor surfaces at the same temperature. Therefore, wind or other adverse condition which adversely affects the sensors operating capability are overcome. If the net radiative flux changes, a nonzero sensor output will again appear until the circuit reaches the new values. Measurement of the integrator output voltage or the average current fed to the sensor will provide a signal which is proportional to the net radiative flux.

I claim:

1. A thermal balance net flux radiometer comprising: radiation sensing means having a first and second face; said first and second faces further comprising a dielectric material including a first thermopile located on the first face and a second thermopile located on the second face, said thermopiles connected in electrical series; amplifier means connected to the sensing means; integrating means; switching means connecting the sensor, the amplifier means and integrating means whereby current will be directed from one face of the sensing means to the other face of the sensing means thereby compensating for temperature differences between the faces, and current measuring means serially connected between the amplifier means and the switching means for indicating net flux.